March 12, 1963 C. W. TAYLOR, JR., ETAL 3,081,212
METHOD AND APPARATUS FOR LAMINATING
Filed Dec. 18, 1958 2 Sheets-Sheet 1

INVENTORS
CHARLES W. TAYLOR, JR.
JOSEPH J. WADLINGER
BY
R. L. Miller
ATTORNEY

3,081,212
METHOD AND APPARATUS FOR LAMINATING

Charles W. Taylor, Jr., and Joseph J. Wadlinger, Akron, Ohio, assignors to The Goodyear Tire & Rubber Company, Akron, Ohio, a corporation of Ohio
Filed Dec. 18, 1958, Ser. No. 781,406
9 Claims. (Cl. 156—164)

This invention relates to laminated products and to a method and apparatus for producing such products from a thin continuous strip of a thermoplastic material and a dimensionally stable base.

It is an object of this invention to provide a method for laminating a thermoplastic film to a base without the use of an adhesive between the base and the film.

It is another object of this invention to provide a method of coating a base with a very thin coating of a thermoplastic resin.

Another object of this invention is to provide an apparatus for minimizing neck-down of thermoplastic film while thinning down and laminating the film to a base. Other objects will appear hereinafter as the description of the invention proceeds.

Figure 1:
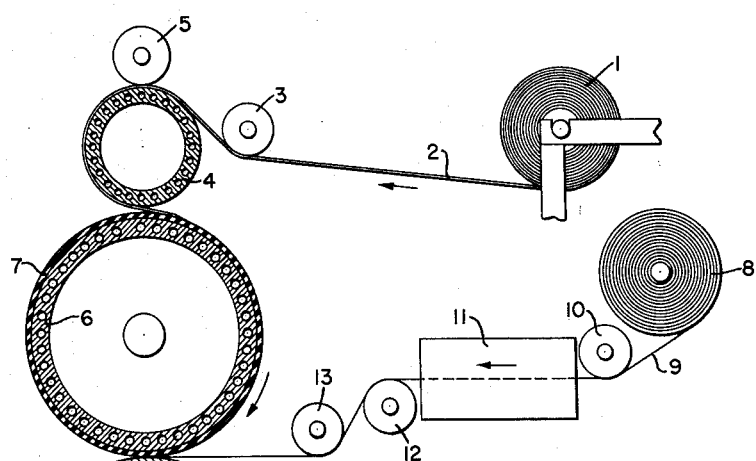
Figure 2:
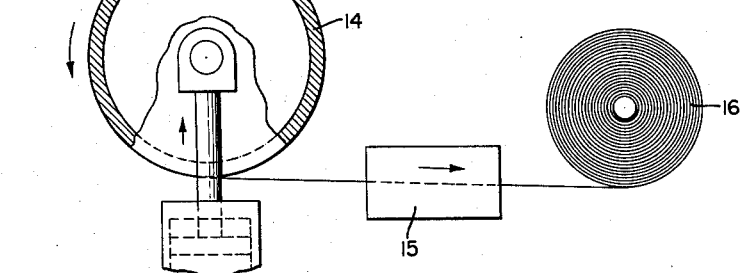
Figure 2:
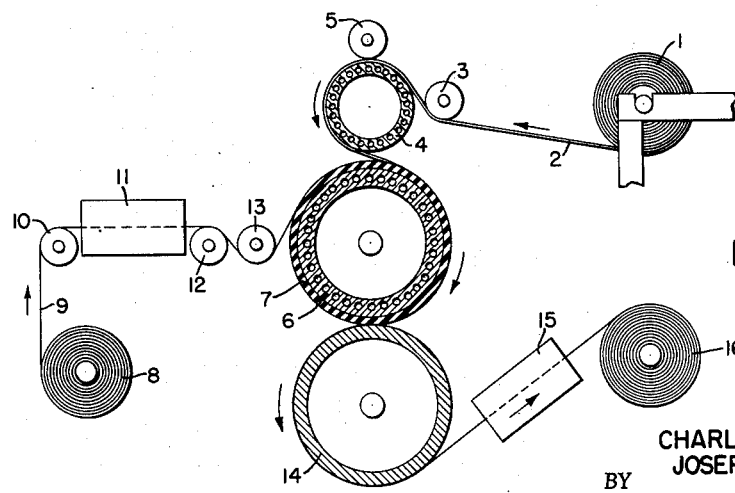
Figure 3:
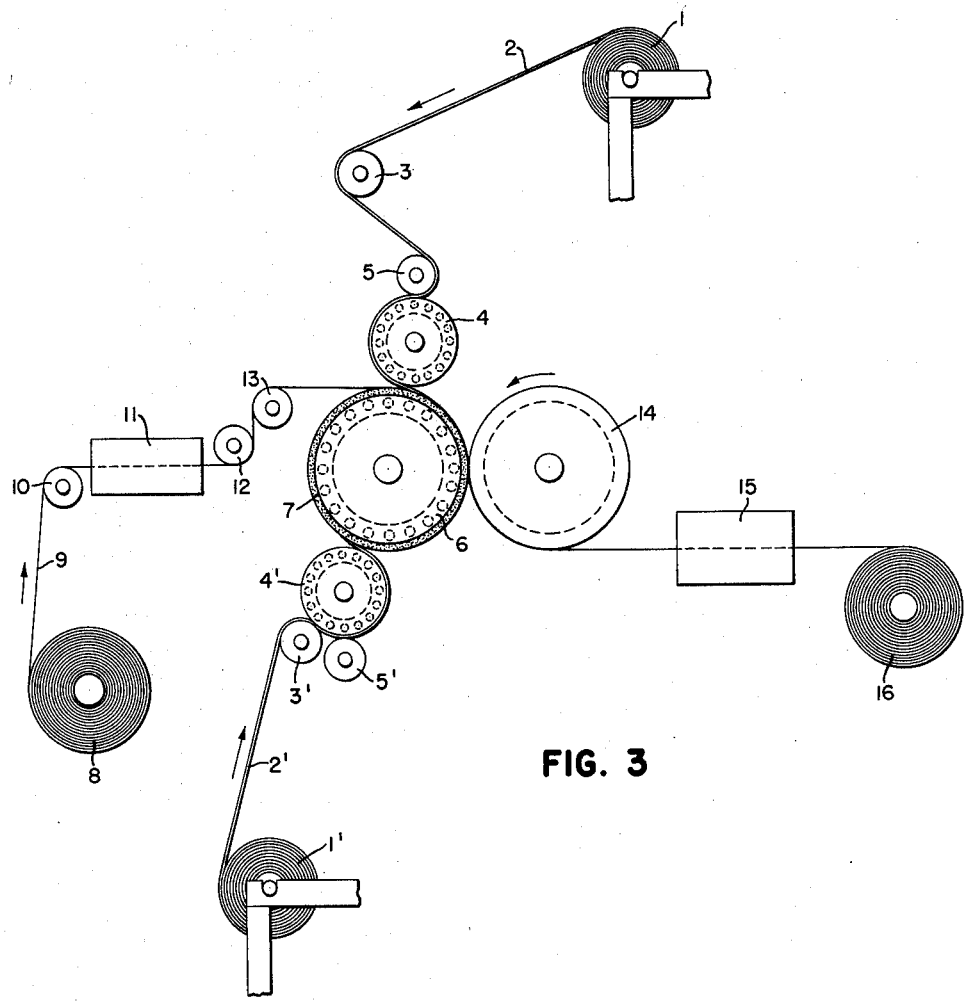

The invention will be described with reference to the accompanying drawings wherein FIG. 1 is a schematic drawing of the apparatus of the invention. FIG. 2 is a schematic drawing of another embodiment of the invention. FIG. 3 is a schematic drawing of still another embodiment which can simultaneously laminate both sides of a base.

Referring to the drawings which illustrate preferred embodiments of the invention, in FIG. 1 the numeral 1 designates a roll of thermoplastic film 2, such as a 60/40 ethylene terephthalate-ethylene isophthalate copolyester film, which is to be laminated to a base. The film 2 is unwound from the roll 1 and is guided by idler roll 3 to a heated driven feed roll 4. For a film of the aforementioned material, a temperature of 140° F. has been found to be satisfactory although it is apparent that the roll temperature may be adjusted in accordance with the requirements of the particular film. One side of the film 2 intimately contacts the surface of the feed roll 4 over a substantial distance around said roll. Pressure roll 5, mounted on a pressure mechanism, not shown, exerts a predetermined pressure of the film 2 which is in contact with the feed roll 4, insures intimate contact between the film 2 and the surface of heated feed roll 4, and prevents trapping of air between the film 2 and the surface of the roll 4. The film 2 absorbs heat from the heated feed roll 4 as it passes over and partly around said feed roll 4.

From roll 4 the film is transferred directly to the heated roll 6 which is heated to a temperature of about 250° F. Preferably the roll 6 is provided with release-type surface, for example, of silicone rubber 7 to prevent the now hot film 2 from sticking to the roll surface. Other materials such as Kel F (a polymer of trifluoromonochloroethylene), Teflon (a polymer of tetrafluoroethylene), acrylate rubbers, or similar materials adapted to form a heat resistant, release type surface can be used to form the surface of the roll 6. The roll 6 can also be coated with other coatings having good release properties such as baked silicone lacquer and baked modified alkyd lacquer coatings. Many of the materials for which the apparatus is suitable will stick to the roll surface when they are at the proper temperature for laminating if the roll is not provided with such a release type surface.

In order that film of different gauges may be processed on the appratus, it is desirable that means be provided to control the distance between the surfaces of rolls 4 and 6. For example, feed roll 4 may be mounted on an adjustable micrometer mounting to move roll 4 toward or away from roll 6. It is apparent that means must be provided at all times to maintain the proper relationship between the adjacent pressure roll 5 and roll 4 which may be accomplished in several ways.

Means (not shown) are provided to regulate the relative speeds of the feed roll 4 and roll 6 so that the surface speed of roll 6 is greater than the surface speed of the feed roll 4 by an amount to impart a longitudinal stretch to the film as it passes from the feed roll 4 to the roll 6. The amount of longitudinal stretch in the film 2 is governed by the speed differential between rolls 4 and 6.

A supply roll 8 containing the dimensionally stable base material 9, such as paper, is positioned so that material 9 passes under idler roll 10 to a heater 11 where it is heated and dried to remove surface moisture. The material 9 then passes over guide roll 12 and under guide roll 13 to heated roll 6 where it contacts the hot stretched film 2. The material 9 and the hot stretched film pass into the nip formed between the surface 7 of roll 6 and pressure roll 14. Pressure roll 14 presses against the roll 6 to subject the laminate to a predetermined pressure to press the film firmly against the base material. Pressure roll 14 is mounted on a variable pressure mechanism to permit regulation of the pressure exerted between these two rolls. The pressure used may be varied over a wide range of pressures. In practice pressures of from slightly greater than contact pressure up to 30 pounds per lineal inch are generally used. Higher pressures can be used if desired. In some instances, the pressure roll 14 may be eliminated as the tension in the film 2 as it contacts roll 6 is sufficient to produce an acceptable laminate. The pressure used is dependent upon the composition of the base material being laminated. The base material film laminate passes partially around pressure roll 14 to a cooling station 15 and thence to the wind-up roll 16.

FIG. 2 shows another embodiment of the invention in which the base to which the film is to be laminated contacts the heated roll 6 before the film 2 is passed to this roll.

In FIG. 2 the supply roll of the base 8 and the supply roll of the thermoplastic film 1 are shown positioned on opposite sides of the heated roll 6. The base 9 is shown as guided over idler roll 10 to heater 11 where it is heated and dried to remove surface moisture. The base 9 then passes over guide roll 12 under guide roll 13 onto the heated roll 6 where it intimately contacts the surface 7 of heated roll 6 and is subsequently covered by the hot stretched film 2. The laminate of the base 9 and the hot stretched film 2 pass around heated roll 6 over a substantial distance on roll 6 with the tension in the film 2 and paper 9 introducing an initial pressure to urge the two materials together while passing over roll 6. Subsequently the laminate enters the nip formed between the surface 7 of heated roll 6 and pressure roll 14 bearing against roll 6 to subject the laminate to an additional predetermined pressure to press the film firmly against the base. The laminate then passes around a substantial portion of pressure roll 14, from thence it passes through a cooling station 15 and onto the windup roll 16.

FIG. 3 shows another embodiment of the invention in which the base is laminated on both sides with the thermoplastic film.

In FIG. 3 the supply roll 8 of the base 9 and the feed rolls 4, 4' for feeding the film to the heated driven roll 6 are positioned so that film and the base contact the roll 6 in such order that a film-base-film sandwich is formed. Thus film 2' is unwound from supply roll 1' and is guided by idler roll 3' to feed roll 4' and under pressure roll 5' to heated driven roll 6. One side of the film 2' intimately contacts the surface of the driven roll 6. The film 2' is stretched and then advanced by the driven roll 6.

The base 9 passes from supply roll 8 over guide roll 10 to heater 11 where it is heated and dried. The base 9 then passes under guide roll 12, over guide roll 13 to heated driven roll 6 where one surface of the base 9 contacts and is laminated to the film 2', which laminate is advanced by the driven roll 6.

Film 2 is unwound from supply roll 1, and is guided by idler roll 3 to feed roll 4 and under pressure roll 5 to heated driven roll 6 where it contacts and covers the other side of the base 9. The film 2 is stretched as it is applied to the base and is simultaneously advanced with the base 9 and the film 2' already on the roll. The film-base-film sandwich passes around heated roll 6 over a substantial portion of the periphery of roll 6 into the nip formed between the surface 7 of the heated roll 6 and pressure roll 14 bearing against roll 6 to subject the laminate to a predetermined pressure to press the two film layers firmly against the base. The laminate passes around a portion of the pressure roll 14 before entering a cooling station 15, thence to windup roll 16.

Each of the modifications include heated feed roll 4 and heated roll 6 and the spacing thereof is a critical factor in attaining minimum neck-down in the film while being stretched as it passes from the feed roll 4 to the heated roll 6. Thus, in order to attain the minimum neck-down, it has been determined that the surface of the feed roll must be spaced at a distance from the surface of the heated roll greater than the thickness the film had before stretching but less than fifteen times the original thickness of said film. If the spacing is kept within these limits, the neck-down is almost negligible and a high quality laminated structure is formed. Generally the distance between the rolls is maintained within from 2 to 10 times the thickness of the film being laminated.

In articles wherein it is desired to have a decorative finish as well as a protective coating, embossing rolls can be placed between pressure roll 14 and windup 16 to impress a design or pattern in the surface of the film laminated to the base. In addition to embossing rolls, it is desirable to have a cooling means such as cold air jets or cooling rolls placed between pressure roll 14 and windup roll 16 to thoroughly cool the laminate before it is wound up because such laminates frequently take the curl of the roll when wound up while still warm. Cooling prevents the setting or shaping of a laminate to the curl of the windup roll.

The invention encompasses coating a base with one or more coats on one side or with one or more coats on both sides. The base can be a non-fibrous base such as aluminum foil, Mylar film and similar bases, or it can be a fibrous base such as paper or cloth. The invention is particularly useful with fibrous bases.

Laminating a base to polyester on both sides can readily be accomplished by coating the base on one side and then coating the other side or, if desired, the apparatus can be modified and a second film supply roll and heated driving feed roll can be set up as illustrated in FIG. 3, and a film-base-film sandwich formed on the heated cushion roll.

Stretching and thinning out of the film occurs between heated feed roll 4 and heated roll 6. The amount of stretch induced in the film is determined by the ratio of the surface speeds of these two rolls. The film can be stretched very little or can be stretched a great deal depending on the thickness of the coating it is desired to apply to the base and to some extent on the thickness of the film being stretched. For example, to apply a 1 mil coating from a 4 mil thick film a stretch ratio of 4 to 1 is used. This is accomplished by operating the cushion roll at a surface speed of 4 times the surface speed of the feed roll. Stretch ratios of up to 12 to 1 or higher can be readily accomplished with coatings on a base of from 0.2 mil to 4 mil, or higher, by proper selection of starting film thickness and stretch ratio.

In the operation of any of the forms of the apparatus shown, the temperatures of the rolls can be varied somewhat according to the softening temperature and sticking temperature of the particular film being laminated. For a 60/40 ethylene terephthalate-ethylene isophthalate copolyester film, feed roll 4 is operated at a temperature in the range of from 120 to 150° F. Generally, 140° F. gives a good control of the stretching of the film and helps to maintain an even thickness over the entire width of the film being stretched. Temperatures in excess of 150° F. cause this particular film to stick to the surface of the roll that is not coated with a release surface. Roll 6 is provided with a heat-resistant, release type surface, as previously described, which may be formed of silicone rubber, Kel F (a polymer of trifluoromonochloroethylene), Teflon (a polymer of tetrafluoroethylene), acrylate rubber, baked silicone lacquer, baked modified alkyd lacquer, or a similar suitable material adapted to form a heat-resistant, releasing surface. Heated roll 6 is operated at a temperature in the range of from 220 to 325° F., generally 250° F. being sufficient to soften the film so that it can be pressed into intimate contact with the base and adhere to the base. These temperatures also allow a product utilizing 60/40 ethylene terephthalate-ethylene isophthalate to be developed without orientation.

A pin-hole-free coating on a fibrous base is accomplished by stretching and laminating thermoplastic film, such as an uncrystallizable polyester film such as a 60/40 ethylene terephthalate-ethylene isophthalate copolyester film, to the base at a temperature of from 270 to 325° F., subjecting the structure thus formed to pressure to insure good adhesion between the polyester and the base, and then stretching and laminating a second polyester film at a temperature of from 180 to 270° F. to the coated side and pressing and cooling the composite article.

Thus, such a polyester film adheres very tightly to a fibrous base such as paper when laminated at 270–325° F., but the polyester resin is very soft in this temperature range and the particles and fibers projecting outwardly from the surface of the paper penetrate through the soft film. At temperatures of about 250° F. the polyester film can be stretched but it is tough and hard and when pressed against a fibrous base such as paper it is not pierced by these outwardly projecting particles and fibers, but it pushes them down and covers them. Adhesion of the film laminated to the fibrous base at temperatures of about 250° F. or lower is not as strong as the adhesion of film laminated to the base at the higher temperature. Pin-hole-free laminates having superior adhesion between the resin film and the base are obtained according to this invention by laminating a first coating at a temperature in the range of from 270–325° F. and then laminating a second coating at a temperature of about 220 to 250° F. Glossy pin-hole-free laminates are produced because the resin film heat seals to itself at this lower temperature, yet is still hard enough to press down the fibers and cover any pin holes in the first coat.

The apparatus of the invention is particularly useful in stretch laminating the amorphous or non-crystallizable films of linear polyesters such as the ethylene terephthalate-ethylene isophthalate copolyesters in which the ethylene terephthalate units comprise from 70 to 30% of the sum of the ethylene terephthalate and ethylene isophthalate units in the copolyester and the ethylene isophthalate units correspondingly comprise from 30 to 70% of said sum and the ethylene terephthalate-2,2'-bis[4-(beta hydroxy ethoxy)phenyl] propane terephthalate copolyesters in which the ethylene terephthalate units comprise from 70 to 30 percent of the sum of the ethylene terephthalate and 2,2'-bis[4-(beta hydroxy ethoxy)phenyl] propane terephthalate units in the copolyester and the 2,2'-bis[4-(beta hydroxy ethoxy)phenyl] propane terephthalate units comprise from 30 to 70 percent of said sum. The 60/40 ethylene terephthalate-ethylene isophthalate copolyester and the 60/40 ethylene terephthalate-2,2'-bis[4-(beta hydroxy ethoxy)phenyl] propane terephthalate copolyesters are preferred species for the practice of the invention. The apparatus can also be used to stretch and laminate other thermoplastic films such as film made from polyvinylchloride, vinylchloride copolymer resins, polyethylene films, isotactic polystyrene films, ethyl cellulose films and cellulose acetate films.

While certain representative embodiments and details have been shown for the purpose of illustrating the invention, it will be apparent to those skilled in this art that various changes and modifications may be made therein without departing from the spirit or scope of the invention.

We claim:

1. A machine for continuously stretching and laminating a thermoplastic polyester film to a base comprising a supply roll of thermoplastic film, a rotatably mounted heated feed roll to simultaneously heat and advance the film from said supply roll when said feed roll is rotated, a pressure roll mounted adjacent said feed roll to urge the film into intimate contact with the surface of the feed roll, a rotatably mounted heated roll in spaced relationship to said feed roll to heat material passing thereover to a predetermined temperature, said heated roll having a release-type surface, means for simultaneously rotating said feed and heated rolls in a pre-determined ratio with the surface speed of the heated roll being faster than the surface speed of said feed roll to simultaneously advance and stretch the film entrained between said feed roll and said heated roll, means for adjusting the distance and maintaining said distance between the surface of the feed roll and the surface of the heated roll, said distance being greater than the original thickness before stretching of the film entrained between said feed roll and said heated roll but less than fifteen times the original thickness of said film to prevent neck-down of the film while it is being stretched, a supply roll of base material positioned in spaced relationship to said heated roll from which said base material is trained to said heated roll for contact with said stretched film, a pressure roll mounted adjacent said heated roll to press against said heated roll to exert pressure on the hot stretched film and said base contacting said film as the base and the film pass between the pressure roll and the heated roll and cooling means to cool the laminate after it passes therethrough.

2. A machine for continuously stretching and laminating a thermoplastic polyester film to a base comprising a supply roll of thermoplastic film, a rotatably mounted heated feed roll to simultaneously heat and advance the film from said supply roll when said feed roll is rotated, a pressure roll mounted adjacent said feed roll to urge the film into intimate contact with the surface of the feed roll, a rotatably mounted heated roll in spaced relationship to said feed roll to heat material passing thereover to a predetermined temperature, said heated roll having a release-type surface, means for simultaneously rotating said feed and heated rolls in a predetermined ratio with the surface speed of the heated roll being faster than the surface speed of said feed roll to simultaneously advance and stretch the film entrained between said feed roll and said heated roll, means for adjusting the distance and maintaining said distance between the surface of the feed roll and the surface of the heated roll, said distance being greater than the original thickness before stretching of the film entrained between said feed roll and said heated roll but less than fifteen times the original thickness of said film to prevent neck-down of the film while it is being stretched, a supply roll of base material positioned in spaced relationship to said heated roll from which said base material is trained onto the surface of said heated roll to contact said stretched film, a pressure roll mounted adjacent said heated roll to press against said heated roll to exert pressure on the hot stretched film and said base contacting said film as the base and the film pass between the pressure roll and the heated roll, and cooling means to cool the laminate after it passes therethrough.

3. A machine for continuously stretching and laminating a thermoplastic polyester film to a base comprising a supply roll of thermoplastic film, a rotatably mounted heated feed roll to simultaneously heat and advance the film from said supply roll when said feed roll is rotated, a pressure roll mounted adjacent said feed roll to urge the film into intimate contact with the surface of the feed roll, a rotatably mounted heated roll in spaced relationship to said feed roll to heat material passing thereover to a predetermined temperature, said heated roll having a release-type surface, means for simultaneously rotating said feed and heated rolls in a predetermined ratio with the surface speed of the heated roll being faster than the surface speed of said feed roll to simultaneously advance and stretch the film entrained between said feed roll and said heated roll, means for adjusting the distance and maintaining said distance between the surface of the feed roll and the surface of the heated roll, said distance being greater than the original thickness before stretching of the film entrained between said feed roll and said heated roll but less than fifteen times the original thickness of said film to prevent neck-down of the film while it is being stretched, a supply roll of base material positioned in spaced relationship to said heated roll from which said base material is trained to said heated roll for contact with said stretched film, means to preheat the base material before it is trained onto the surface of said heated roll, a pressure roll adjacent said heated roll to press against said heated roll to exert pressure on the hot stretched film and said base contacting said film as the base and the film pass between the pressure roll and the heated roll and cooling means to cool the laminate after it passes therethrough.

4. A machine according to claim 1 having a second film supply roll, a second rotatably mounted heated feed roll to simultaneously heat and advance film from said second supply roll when said feed roll is rotated, a pressure roll mounted adjacent said second feed roll to urge the film into intimate contact with said second feed roll, said second feed roll advancing said film to the heated roll ahead of the base so that the base is between two film layers before the pressure roll presses the laminate.

5. The machine of claim 1 in which the feed roll is maintained at a temperature in the range of from 120 to 150° F. and the heated roll is maintained at a temperature in the range of from 220 to 325° F.

6. In a machine for stretching and laminating a thermoplastic polyester film in which the film is fed from a feed roll directly to a heated roll and the heated roll is rotated at a surface speed faster than the surface speed of the feed roll, the improvement which comprises spacing and maintaining the adjacent surface of the feed roll spaced from the surface of the heated roll a distance greater than the thickness of the unstretched film but less than fifteen times the thickness of said film.

7. The method of forming a glossy pin-hole-free thermoplastic polyester coating on a dimensionally stable fibrous base which comprises (a) stretching a thermoplastic polyester film at a temperature of from 270 to 300° F., applying the hot stretched film to the base material and subjecting the structure to pressure to form intimate contact between the film and base material and (b) stretching a second thermoplastic polyester film at a temperature of from 180 to 270° F. and applying the hot stretched film to the polyester side of the laminate formed in (a) at a temperature of from 180 to 270° F., applying pressure to the structure to form intimate contact between the first and second film, and then cooling the composite article.

8. A machine for continuously stretching and laminating a thermoplastic polyester film to a base comprising a supply roll of thermoplastic film, a rotatably mounted heated feed roll to simultaneously heat and advance the film from said supply roll when said feed roll is rotated, a rotatably mounted heated roll in spaced relationship to said feed roll to heat material passing thereover to a predetermined temperature, said heated roll having a release-type surface, means for simultaneously rotating said feed and heated rolls in a predetermined ratio with the surface speed of the heated roll being faster than the surface speed of said feed roll to simultaneously advance and stretch the film entrained between said feed roll and said heated roll, means for adjusting the distance and maintaining said distance between the surface of the feed roll and the surface of the heated roll, said distance being greater than the original thickness before stretching of the film entrained between said feed roll and said heated roll but less than fifteen times the original thickness of said film to prevent neck-down of the film while it is being stretched, a supply roll of base material positioned in spaced relationship to said heated roll from which said base material is trained to said heated roll for contact with said stretched film, and a pressure roll mounted adjacent said heated roll to press against said heated roll to exert pressure on the hot stretched film and said base contacting said film as the base and the film pass between the pressure roll and the heated roll.

9. A machine for continuously stretching and laminating a thermoplastic polyester film to a base comprising a supply roll of thermoplastic film, a rotatably mounted heated feed roll to simultaneously heat and advance the film from said supply roll when said feed roll is rotated, a pressure roll mounted adjacent said feed roll to urge the film into intimate contact with the surface of the feed roll, a rotatably mounted heated roll in spaced relationship to said feed roll to heat material passing thereover to a predetermined temperature, said heated roll having a release-type surface, means for simultaneously rotating said feed and heated rolls in a predetermined ratio with the surface speed of the heated roll being faster than the surface speed of said feed roll to simultaneously advance and stretch the film entrained between said feed roll and said heated roll, means for adjusting the distance and maintaining said distance between the surface of the feed roll and the surface of the heated roll, said distance being greater than the original thickness before stretching of the film entrained between said feed roll and said heated roll but less than fifteen times the original thickness of said film to prevent neck-down of the film while it is being stretched, and a supply roll of base material positioned in spaced relationship to said heated roll from which said base material is trained to said heated roll for contact with said stretched film.

References Cited in the file of this patent
UNITED STATES PATENTS

| | | |
|---|---|---|
| 2,022,851 | Galligan et al. | Dec. 3, 1935 |
| 2,154,474 | Scott | Apr. 18, 1939 |
| 2,556,008 | Spalding | June 5, 1951 |
| 2,737,764 | Lewis | Mar. 13, 1956 |
| 2,747,224 | Koch et al. | May 29, 1956 |
| 2,790,480 | Lithio | Apr. 30, 1957 |
| 2,861,022 | Lundsager | Nov. 18, 1958 |